(12) United States Patent
Zeutenhorst

(10) Patent No.: US 11,021,026 B2
(45) Date of Patent: Jun. 1, 2021

(54) MOTORCYCLE TRAILER HITCH LEVELING ASSEMBLY

(71) Applicant: Randy Zeutenhorst, Winterset, IA (US)

(72) Inventor: Randy Zeutenhorst, Winterset, IA (US)

( * ) Notice: Subject to any disclaimer, the term of this patent is extended or adjusted under 35 U.S.C. 154(b) by 245 days.

(21) Appl. No.: 16/208,692

(22) Filed: Dec. 4, 2018

(65) Prior Publication Data

US 2020/0171898 A1   Jun. 4, 2020

(51) Int. Cl.
- *B60D 1/06* (2006.01)
- *B60D 1/46* (2006.01)
- *B60D 1/00* (2006.01)

(52) U.S. Cl.
CPC ............... *B60D 1/46* (2013.01); *B60D 1/06* (2013.01); *B60D 2001/003* (2013.01)

(58) Field of Classification Search
CPC ....... B60D 1/46; B60D 1/06; B60D 2001/003
See application file for complete search history.

(56) References Cited

U.S. PATENT DOCUMENTS

| | | | | |
|---|---|---|---|---|
| 3,035,856 | A * | 5/1962 | Mleczko | B60D 1/465 280/490.1 |
| 3,734,540 | A * | 5/1973 | Thiermann | B60D 1/00 280/482 |
| 4,248,451 | A * | 2/1981 | Usinger | B60D 1/075 280/406.2 |
| D296,075 | S * | 6/1988 | Jones | D15/7 |
| 4,792,151 | A | 12/1988 | Feld | |
| 5,765,850 | A | 6/1998 | Emerson | |
| 6,341,795 | B1 | 1/2002 | Zerkel | |
| 8,733,781 | B2 | 5/2014 | Sims | |
| 9,283,821 | B2 * | 3/2016 | Woolf | B60D 1/07 |
| 9,415,647 | B2 | 8/2016 | Woolf | |

* cited by examiner

*Primary Examiner* — Minnah L Seoh
*Assistant Examiner* — Marlon A Arce

(57) ABSTRACT

A motorcycle trailer hitch leveling apparatus for leveling a motorcycle trailer hitch includes a pair of sides each having a lower section, an angled section, an upper section, an inner face, and an outer face. The inner face of the lower section of each side is a first distance apart equaling a second distance between the outer face of the upper section of each side. The first distance and the second distance substantially conform to a width of a trailer tongue. The lower section of each of the pair of sides is configured to selectively engage with the trailer tongue and the upper section of each of the pair of sides is configured to selectively engage with a standard ball coupler. A bridge piece is coupled between the upper section of each of the pair of sides.

4 Claims, 4 Drawing Sheets

MOTORCYCLE TRAILER HITCH LEVELING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to motorcycle trailer hitch and more particularly pertains to a new motorcycle trailer hitch for leveling a motorcycle trailer hitch.

BRIEF SUMMARY OF THE INVENTION

An embodiment of the disclosure meets the needs presented above by generally comprising a pair of sides comprising a left side and a right side. Each of the pair of sides has a lower section, an angled section, an upper section, an inner face, and an outer face. The inner face of the lower section of the left side is a first distance from the inner face of the lower section of the right side. The outer face of the upper section of the left side is a second distance from the outer face of the upper section of the right side. The first distance is equal to the second distance and each of the first distance and the second distance substantially conform to a width of a trailer tongue. The lower section of each of the pair of sides is configured to selectively engage with the trailer tongue and the upper section of each of the pair of sides is configured to selectively engage with a standard ball coupler. A bridge piece is coupled between the upper section of each of the pair of sides.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
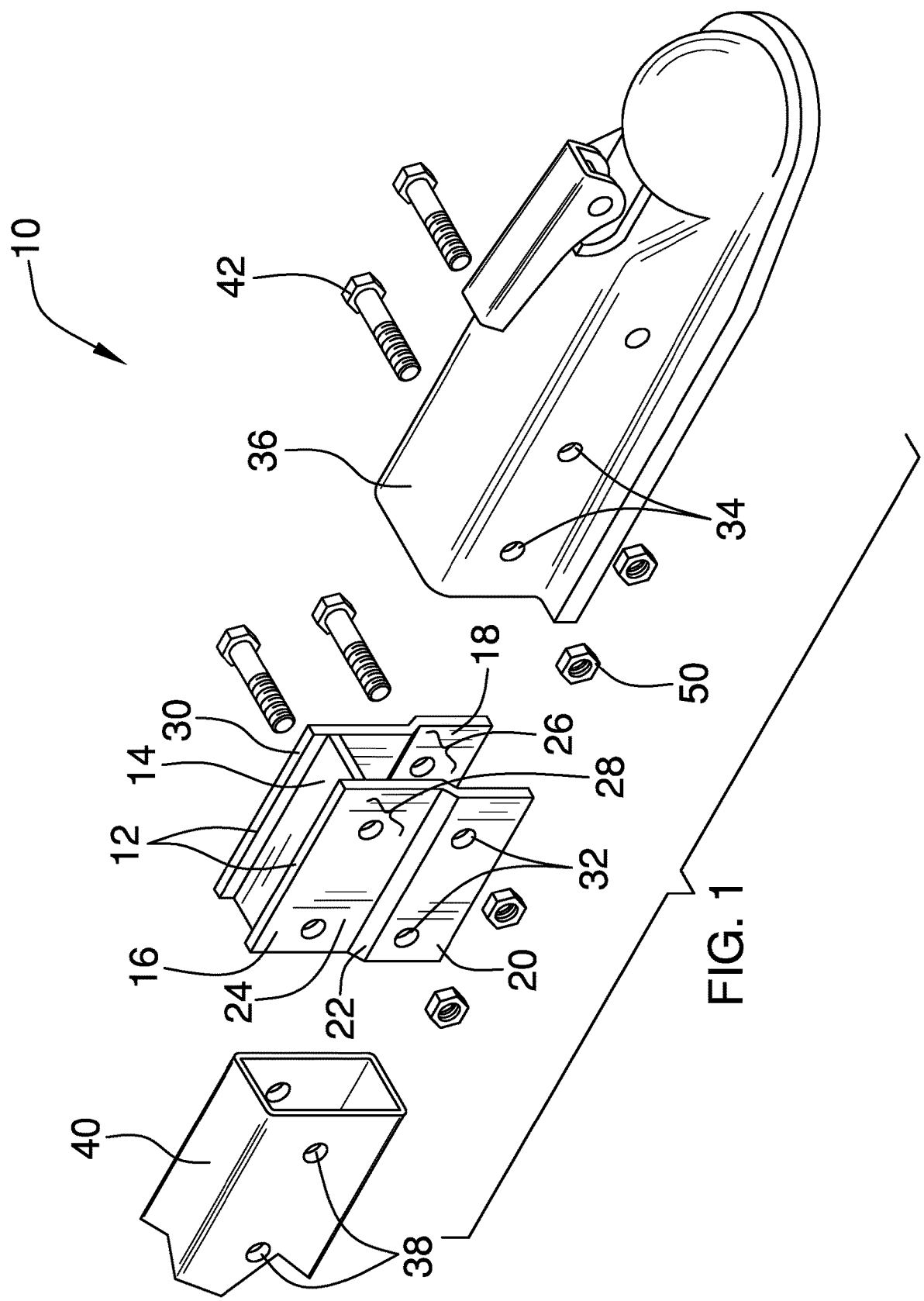
FIG. 1 is an isometric view of a motorcycle trailer hitch leveling apparatus according to an embodiment of the disclosure.
Figure 2:
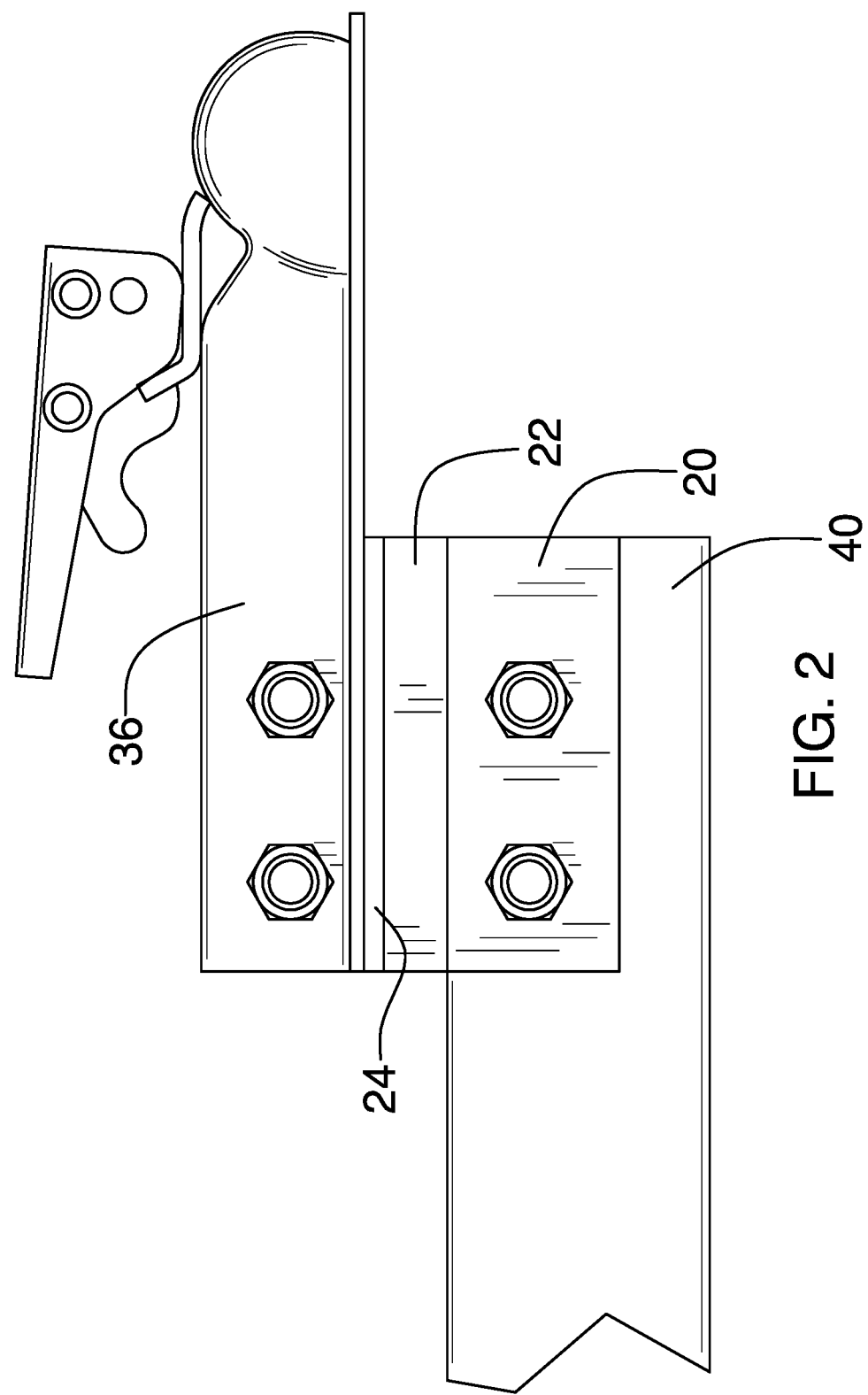
FIG. 2 is a side elevation view of an embodiment of the disclosure.
Figure 3:
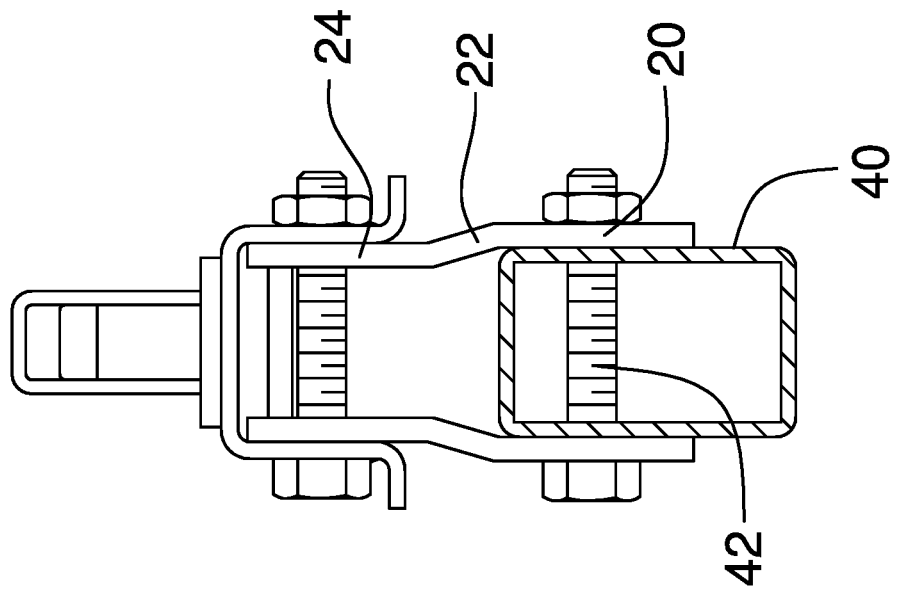
FIG. 3 is a front elevation view of an embodiment of the disclosure.
Figure 4:
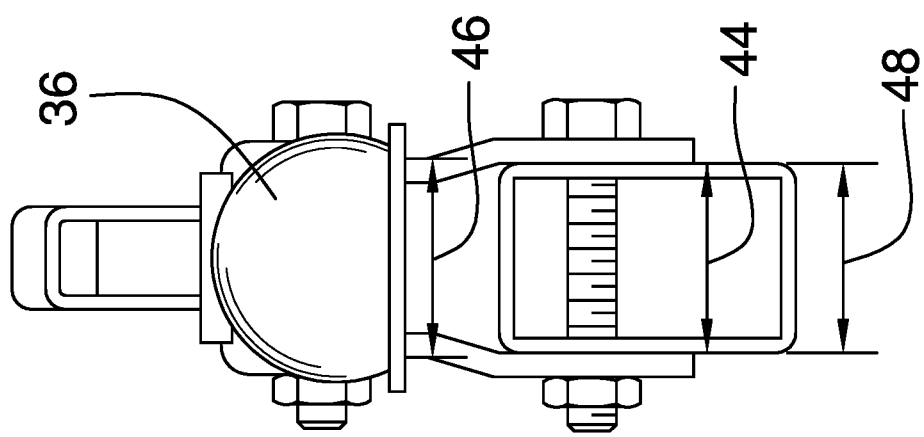
FIG. 4 is a rear elevation view of an embodiment of the disclosure.
Figure 5:
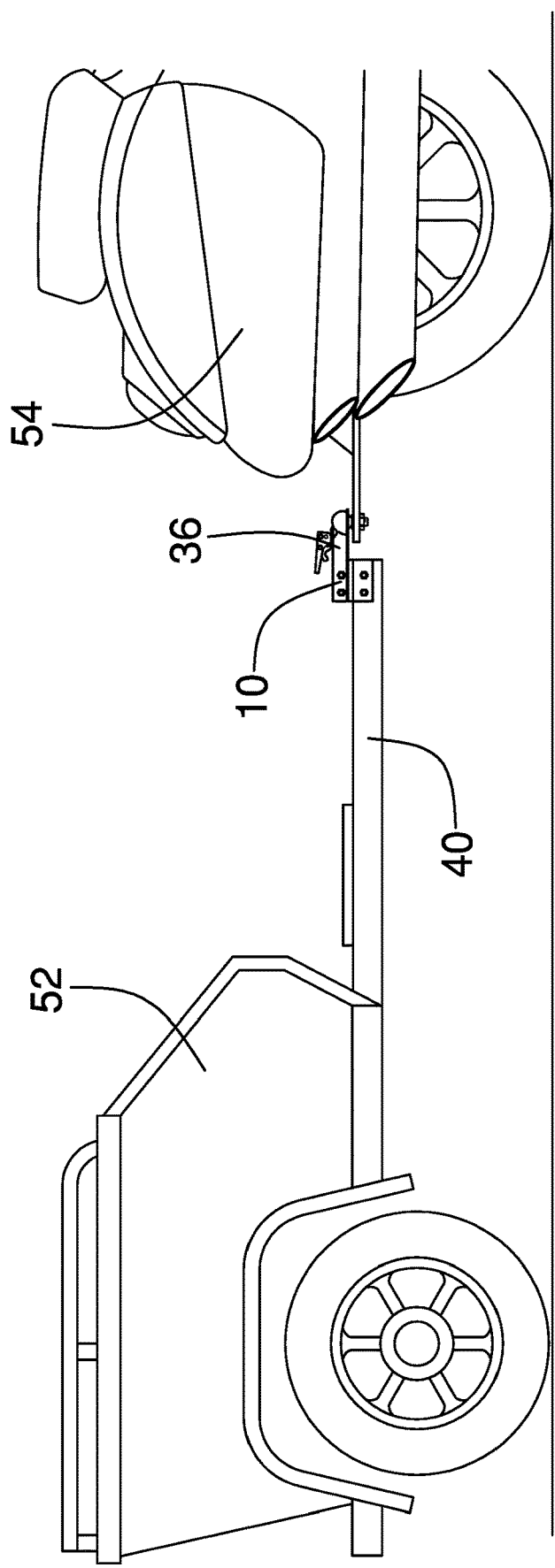
FIG. 5 is an in-use view of an embodiment of the disclosure.

With reference now to the drawings, and in particular to FIGS. 1 through 5 thereof, a new motorcycle trailer hitch embodying the principles and concepts of an embodiment of the disclosure and generally designated by the reference numeral 10 will be described.

As best illustrated in FIGS. 1 through 5, the motorcycle trailer hitch leveling apparatus 10 generally comprises a pair of sides 12 and a bridge piece 14. The pair of sides 12 comprises a left side 16 and a right side 18, each having a lower section 20, an angled section 22, an upper section 24, an inner face 26, and an outer face 28. The upper section 24 has an upper edge 30. The bridge piece 14 is perpendicularly coupled between the upper section 24 of each of the pair of sides proximal the upper edge 30. Each of the lower section 20 and the upper section 24 have a pair of through holes 32. The pair of through holes 32 of the upper section is configured to align with a first plurality of mounting holes 34 of a standard ball coupler 36. The pair of through holes 32 of the lower section is configured to align with a second plurality of mounting holes 38 of a trailer tongue 40. Each of the pair of through holes 32 is configured to receive a bolt 42. The inner face 26 of the lower section of the left side 16 is a first distance 44 from the inner face 26 of the lower section of the right side 18. The outer face 28 of the upper section of the left side 16 is a second distance 46 from the outer face 28 of the upper section of the right side 18. The first distance 44 is equal to the second distance 46, wherein each of the first distance 44 and the second distance 46 substantially conform to a width 48 of the trailer tongue. The lower section 20 of each of the pair of sides is configured to selectively engage with the trailer tongue 40. The upper section 24 of each of the pair of sides is configured to selectively engage with the standard ball coupler 36.

In use, rather than attaching the standard ball coupler 36 directly to the trailer tongue 40, the motorcycle trailer hitch leveling apparatus 10 is first attached to the trailer tongue 40. The trailer tongue 40 is engaged between the inner face 26 of the lower section of the pair of sides. The standard ball coupler 36 is then engaged around the outer face 28 of the upper section of the pair of sides. The bolts 42 are placed through the pair of through holes 32 of the upper section 24 passing through the first plurality of mounting holes 34 and through the pair of through holes 32 of the lower section 20 passing through the second plurality of mounting holes 34. A nut 50 is engaged with each bolt 42 to fix the motorcycle trailer hitch leveling apparatus 10 between the standard ball coupler 36 and the trailer tongue 40. The standard ball coupler 36 is now elevated relative the trailer tongue 40 to prevent a cargo trailer 52 from lifting a motorcycle 54 to which it is attached.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A motorcycle trailer hitch leveling apparatus comprising:
    a pair of sides, the pair of sides comprising a left side and a right side each of the pair of sides having a lower section, an angled section, an upper section, an inner face, and an outer face, the inner face of the lower section of the left side being a first distance from the inner face of the lower section of the right side, the outer face of the upper section of the left side being a second distance from the outer face of the upper section of the right side, the first distance being equal to the second distance, wherein each of the first distance and the second distance substantially conform to a width of a trailer tongue, the lower section of each of the pair of sides being configured to selectively engage with the trailer tongue, the upper section of each of the pair of sides being configured to selectively engage with a ball coupler; and
    a bridge piece coupled to the pair of sides, the bridge piece being coupled between the upper section of each of the pair of sides, the bridge piece being positioned parallel to and inset from respective upper edges of the upper sections of the pair of sides.

2. The motorcycle trailer hitch leveling apparatus of claim 1 further comprising each of the lower section and the upper section having a pair of through holes, the pair of through holes of the upper section being configured to align with a first plurality of mounting holes of the ball coupler, the pair of through holes of the lower section being configured to align with a second plurality of mounting holes of a trailer tongue, each of the pair of through holes being configured to receive a bolt.

3. A motorcycle trailer hitch leveling apparatus comprising:
    a pair of sides, the pair of sides comprising a left side and a right side each of the pair of sides having a lower section, an angled section, an upper section, an inner face, and an outer face, each of the lower section and the upper section having a pair of through holes, the pair of through holes of the upper section being configured to align with a first plurality of mounting holes of a ball coupler, the pair of through holes of the lower section being configured to align with a second plurality of mounting holes of a trailer tongue, each of the pair of through holes being configured to receive a bolt, the inner face of the lower section of the left side being a first distance from the inner face of the lower section of the right side, the outer face of the upper section of the left side being a second distance from the outer face of the upper section of the right side, the first distance being equal to the second distance, wherein each of the first distance and the second distance substantially conform to a width of the trailer tongue, the lower section of each of the pair of sides being configured to selectively engage with the trailer tongue, the upper section of each of the pair of sides being configured to selectively engage with the ball coupler; and
    a bridge piece coupled to the pair of sides, the bridge piece being coupled between the upper section of each of the pair of sides, the bridge piece being positioned parallel to and inset from respective upper edges of the upper sections of the pair of sides.

4. A ball coupler and motorcycle trailer hitch leveling apparatus system comprising:
    a ball coupler, the ball coupler having a first plurality of mounting holes;
    a pair of sides, the pair of sides comprising a left side and a right side each of the pair of sides having a lower section, an angled section, an upper section, an inner face, and an outer face, the upper section being selectively engageable with the ball coupler, each of the lower section and the upper section having a pair of through holes, the pair of through holes of the upper section aligning with the first plurality of mounting holes of the ball coupler, the pair of through holes of the lower section being configured to align with a second plurality of mounting holes of a trailer tongue, each of the pair of through holes being configured to receive a bolt, the inner face of the lower section of the left side being a first distance from the inner face of the lower section of the right side, the outer face of the upper section of the left side being a second distance from the outer face of the upper section of the right side, the first distance being equal to the second distance, wherein each of the first distance and the second distance substantially conform to a width of the trailer tongue, the lower section of each of the pair of sides being configured to selectively engage with the trailer tongue; and
    a bridge piece coupled to the pair of sides, the bridge piece being coupled between the upper section of each of the pair of sides, the bridge piece being positioned parallel to and inset from respective upper edges of the upper sections of the pair of sides.

* * * * *